Nov. 28, 1950 G. C. SZIKLAI 2,531,834
SPEED CONTROL SYSTEM
Filed May 9, 1946
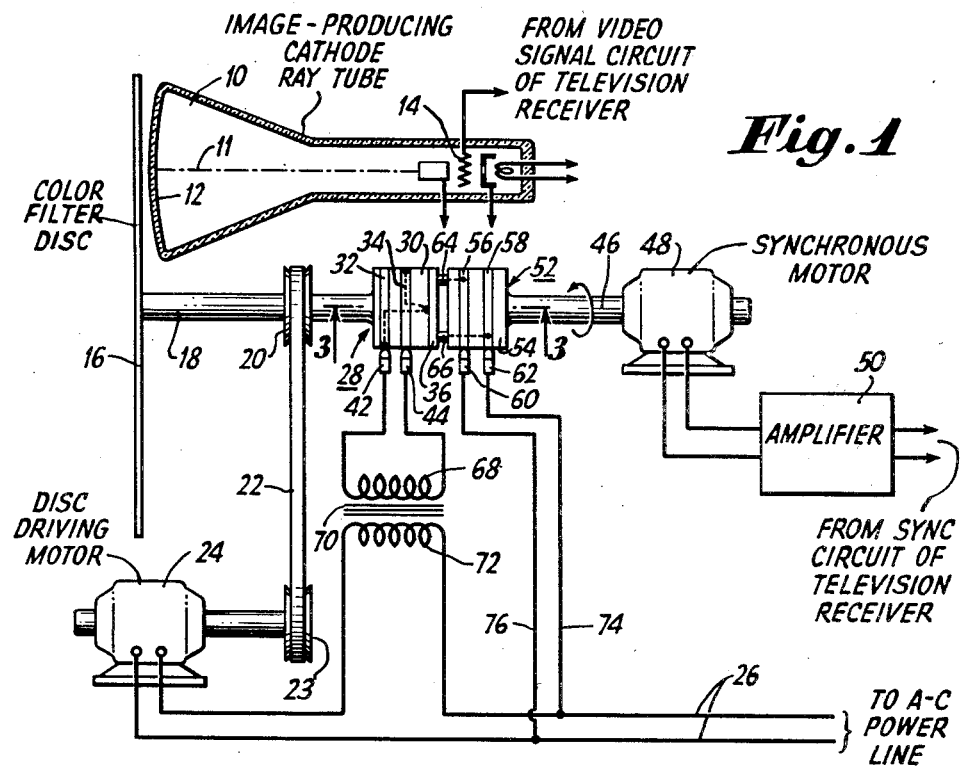
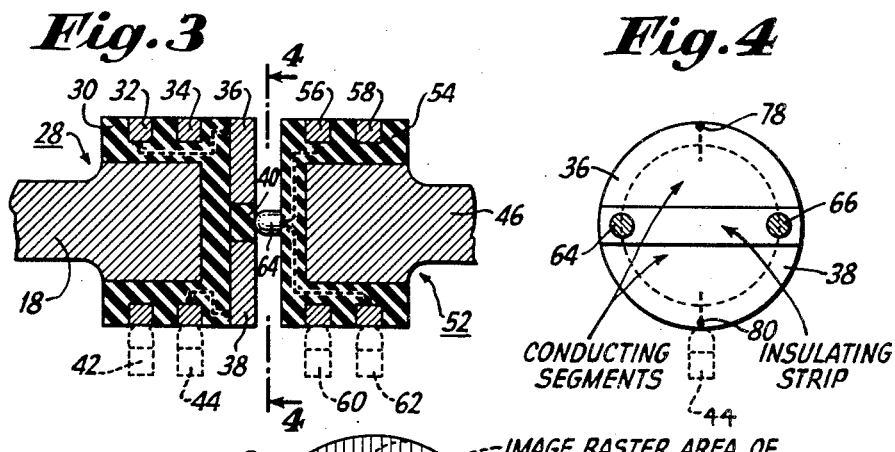
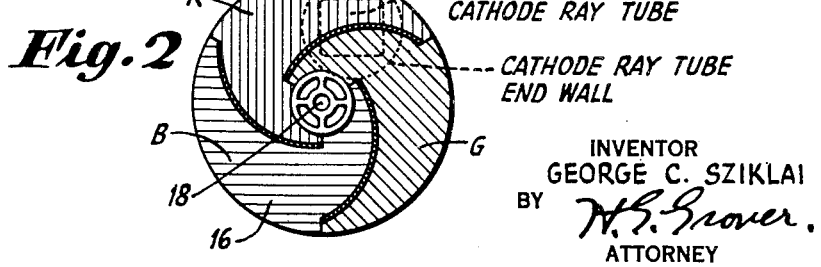
INVENTOR
GEORGE C. SZIKLAI
BY  *W. S. Grover*
ATTORNEY Patented Nov. 28, 1950

2,531,834

UNITED STATES PATENT OFFICE 2,531,834

SPEED CONTROL SYSTEM

George C. Sziklai, Princeton, N. J., assignor to Radio Corporation of America, a corporation of Delaware Application May 9, 1946, Serial No. 668,447

6 Claims. (Cl. 318—73)

The present invention relates to speed control circuits, and more particularly relates to a motor speed control circuit as applied to television receivers for maintaining a color filter disc or drum in synchronism with a similar color filter disc at the transmitter. Although especially designed for use in television, in its broader aspect a circuit of this nature has utility in any field where the speed of a motor, or a motor driven object, must be precisely regulated and, thus, its use in a television system is to be understood as illustrative rather than limiting.

In television systems adapted to reproduce an image which may be viewed by an observer in colors closely approximating those of the original subject, it is known to utilize at both the transmitter and receiver component or primary color filter elements mounted on discs or drums which are intended to be rotated both in synchronism and in phase with one another. The means for thus rotating the discs or drums may take the form of synchronous motors, and since considerable power is required for such rotation, these motors must be of relatively large size and weight. In addition to this disadvantage, the expense occasioned by the use of synchronous motors having the required power output constitutes an important fraction of the total production cost of the apparatus. This is true even when part of the power is supplied by a non-synchronous motor.

It has therefore been proposed to overcome the above drawbacks by employing a friction brake to effect synchronization. In such a system, a tone wheel is mounted on the shaft of the rotatable color filter element, or is coupled thereto, so as to generate a wave having a frequency which is directly proportional to the frequency at which the filter segments traverse the image-reproducing area. A second wave is then derived from the synchronizing information contained in the received color television signal. The phase of the two waves is compared by any suitable means, and the output of the phase-comparing means is supplied to the friction brake. The phase-comparing means is so designed as to yield a rectified output current which varies in value in accordance with the phase relationship of the two waves, and the friction brake is preferably electro-magnetically controlled by applying the rectified output current of the phase-comparing means to an operating coil. In this manner, changes in the phase relationship of the two waves produce corresponding changes in the retarding action of the friction brake.

It has been found that a system utilizing a friction brake as set forth above does not yield a sufficiently precise control over the speed of the component color filter disc, and, as a result, edges of the filter segments may at times be observed in the reproduced image. Also, the permanent use of a friction brake places a heavy load upon the driving motor, which necessitates not only a motor of large size, but, in addition, increases the amount of current consumed.

In accordance with the present invention, means are provided whereby the rotating component color filter disc or drum at the receiver may be kept in synchronism with a similar rotating component color filter disc at the transmitter without the use of an associated friction brake, and also without the necessity for employing a large synchronous motor to provide power for driving the color filter disc itself.

As set forth in one embodiment of the invention, an asynchronous motor, deriving its energy directly from an A.-C. power line, is utilized to rotate the component color filter disc. The latter may be directly mounted on the motor shaft, or, if desired, may have its shaft coupled to the motor shaft in any desired manner, as by a belt or gearing. A set of electrical contacts rotates integrally with the component color filter disc, and these contacts normally have a predetermined relationship with a second set of electrical contacts mounted on a further shaft rotating co-axially with the color filter disc. This latter shaft is driven by a small, lightweight, synchronous motor, the speed of which is controlled in accordance with the synchronizing information contained in the received color television signal. When the component color filter disc is rotating at its proper speed, or, in other words, synchronously and in phase with the color filter disc at the transmitter, the two sets of electrical contacts turn as a unit. However, when there is a discrepancy between the speeds of rotation of the two shafts, then one set of contacts undergoes an angular displacement relative to the other set. This causes an electrical current to flow through the contacts to one winding of a transformer. The other winding of the transformer is connected to the power line terminals in series with the asynchronous motor driving the color filter disc. Hence, the current introduced into the transformer as a result of the angular displacement of the two sets of contacts relative to one another creates in the transformer a magnetic field the action of which is either to increase or decrease the effective current supplied to the asynchronous motor, depending upon the direction of angular displacement of the sets of contacts relative to one another. As a result of this action, the speed of rotation of the color filter disc is selectively increased or decreased, until it is again rotating at the same speed as the shaft controlled by the synchronizing signal information. Accordingly, the two shafts respectively carrying the two sets of electrical contacts are maintained at substantially identical speeds of rotation, and no irregularity or distortion due to a lack of synchronism between the transmitter and receiver color discs is present in the reproduced image.

One object of the present invention, therefore, is to provide means for synchronizing the speed of rotation of one element with that of another element remotely positioned therefrom.

Another object of the invention is to provide, in a color television system, an improved means for synchronizing the rotation of two component color filter discs or drums respectively associated with the television transmitting and receiving apparatus.

A still further object of the invention is to provide an improved means for controlling the speed of an asynchronous motor.

Other objects and advantages will be apparent from the following description of a preferred form of the invention and from the drawings, in which:

Fig. 1 is a block and circuit diagram of a speed control system in accordance with one embodiment of the present invention;

Fig. 2 is a plan view of the component color filter disc of Fig. 1;

Fig. 3 is a sectional view of Fig. 1 along the line 3—3; and

Fig. 4 is a sectional view of Fig. 3 along the line 4—4.

Referring first to Fig. 1 of the drawing, there is shown a portion of a television receiving apparatus which includes an image-reproducing cathode ray tube generally designated by the reference numeral 10. Tube 10 is provided in the usual manner with a luminescent image-producing target surface 12 on which images are successively reproduced by an electron beam (conventionally shown at 11) from an electron gun including a control electrode schematically represented by the reference numeral 14. The electron beam is deflected repeatedly over substantially the same area of the reproducing surface 12 by suitable electrostatic or electro-magnetic deflecting means (not shown) associated with or forming a part of the cathode ray tube 10. Modulation video or image signals as received upon any suitable receiver unit (not shown) may be supplied to the control electrode 14 to control the intensity of the cathode ray beam 11 as it impacts the target 12 to produce the electro-optical image.

A component color filter disc 16 of any suitable design is arranged to rotate in front of the image-reproducing target surface 12. Disc 16 is provided with component color filter segments, the colors of which correspond to the images successively reproduced. A disc having segments of one possible configuration is illustrated in Fig. 2. For tri-color television, the colors of the individual filter segments are usually red, green and blue-violet respectively. Images corresponding to these three color aspects of an object field are successively reproduced on the target surface 12 of tube 10, and are viewed through successive filter segments of disc 16 corresponding in color thereto.

The component color filter disc shown in Fig. 2 has two sets of filter segments, but it will be understood that the number of colors, number of segments, and shape of the segments may be changed as desired, the invention in no way depending upon the particular selection illustrated. Furthermore, other rotatable filter constructions may be employed if desired. For example, the disc 16 may be replaced by a rotatable color filter drum of the nature set forth in United States Patent No. 2,548,649, issued to Otto H. Schade on February 11, 1949, or, where desired, the equivalent structure in the form of a truncated conical filter element may be chosen.

The color filter disc 16 is mounted on a shaft 18 to which a pulley 20 is attached. A belt 22 passes over both pulley 20 and a further pulley 23 mounted on the shaft of a motor 24. Motor 24 is of the asynchronous type, such as an induction motor, and is energized by current supplied from the A.-C. power line conductors 26.

Carried by the opposite end of shaft 18 from the color filter disc 16 is a cylindrical switch contact assembly generally designated by the reference numeral 28. This assembly 28 includes an insulating sleeve 30 (see Fig. 3) in which are embedded two slip rings 32 and 34. The outer end of the insulating sleeve 30 secures in position two arcuate segments 36 and 38 formed of conducting material. An extension 40 of the insulating sleeve 30 separates the conducting segments 36 and 38, as best shown in Figs. 3 and 4, and acts to provide a smooth end surface for the assembly 28.

The conducting segment 36 is electrically joined to the slip ring 32, while the conducting segment 38 is electrically joined to the slip ring 34. A stationary brush 42 is provided for slip ring 32, and a similar stationary brush 44 is provided for slip ring 34.

A second rotatable shaft 46 is so positioned as to be substantially coaxial with the shaft 18. This shaft 46 is driven by a small synchronous motor 48 deriving its energy through an amplifier 50 from some point in the sync circuit of the television receiver (not shown). In this manner, the speed of the synchronous motor 48 is under the control of the synchronizing information contained in the received composite television signal, and the speed of shaft 46 will at all times bear a direct relation to the speed of rotation of the color filter disc at the transmitter.

Mounted on shaft 46 is a second switch contact assembly generally designated by the reference character 52. Assembly 52 includes an insulating sleeve 54 which may, for example, be similar in some respects to the insulating sleeve 30 of the contact assembly 28. Embedded in the insulating sleeve 54 are two slip rings 56 and 58, the slip ring 56 engaging a stationary brush 60, and the slip ring 58 engaging a similar stationary brush 62.

Rigidly affixed to the end surface of the insulating sleeve 54, which lies in face-to-face relation with the end surface of switch assembly 28 formed by the conducting segments 36 and 38 and the insulating strip 40, are two knob-like contacts, or brushes, 64 and 66. These contacts 64, 66, as stated above, project from the end surface of insulating sleeve 54, and lie near the periphery of the assembly 52, as best shown in Figs. 1 and 4. Furthermore, contacts 64 and 66 are diametrically opposed to one another and to the axis of shaft 40, so that when the two contact assemblies 28 and 52 are lying in face-to-face relation as shown in Figs. 1 and 3, the contacts 64, 66 may both simultaneously engage the surface of the insulating extension 40 of the sleeve 30, as shown in Fig. 4. Contact 64 is electrically connected to the slip ring 56, while contact 66 is electrically connected to the slip ring 58.

The two brushes 42, 44 are respectively connected to the ends of one winding 68 of a transformer 70. The other winding 72 of transformer 70 is connected in series with the color filter disc driving motor 24 across the power line conductors 26. Brush 62 is joined to one of these conductors 26 by a lead 74, while brush 60 is joined to the other of the conductors 26 by a lead 76.

In the operation of the system, it will first be assumed that the color filter disc 16 mounted on shaft 18 is rotating at proper speed, or, in other words, synchronously with the color filter disc at the transmitter. The shaft 46, which is driven by the synchronous motor 48, is also rotating at this same speed, since the motor 48 is directly controlled through the amplifier 50 from the sync circuit of the television receiver. The two contacts 64, 66 carried by the insulating sleeve 54 then assume and retain a selected frictional engagement with the surface of the insulating strip 40. This frictional relationship between the contacts 64 and 66 and the insulating strip 40 when the shafts 18 and 46 are rotating at identical speeds, is best illustrated in Figs. 3 and 4.

Now assume that for some reason the driving motor 24 rotates the color filter disc 16 at greater than normal speed. Under these conditions, the switch assembly 28 will rotate faster than the switch assembly 52, and the contacts 64, 66 will be angularly displaced relative to the insulating strip 40. When this angular displacement occurs, the contact 66 will frictionally engage the conducting segment 36, and the contact 64 will frictionally engage the conducting segment 38. Since the contact 66 is connected to the slip ring 58, and since the contact 64 is connected to the slip ring 56, then current from the power line conductors 26 will flow through the leads 74 and 76, the slip rings 56 and 58, contacts 64 and 66, the conducting segments 36, 38, the slip rings 32, 34, and through the winding 68 of transformer 70. This current flow through the winding 68, under the conditions just set forth when the color filter disc 16 is rotating at a speed greater than normal, is such as to oppose the normal flow of current through the other winding 72 of transformer 70. Hence, the amount of current supplied to driving motor 24 will be reduced, and the color filter disc 16 will decrease in speed to a point where the contacts 64, 66 again engage the insulating strip 40 (as shown in Fig. 4), whereupon the current flow through the switch assemblies 28 and 52, and hence the transformer winding 68, will be cut off.

Under the opposite condition when the color filter disc 16 is rotating at less than normal speed, then the above relationships will be reversed. That is, the contact 64 will frictionally engage the conducting segment 36, and the contact 66 will frictionally engage the conducting segment 38. This will reverse the direction of current flow through the transformer winding 68 so that it will now be such as to add to the flow of current in winding 72, and thus increase the speed of the driving motor 24. The disc 16 will accordingly be speeded up to a point where the contacts 64, 66 again are in their normal position on the insulating strip 40 shown in Fig. 4.

It will now be appreciated that the present invention provides means whereby one rotating member is automatically synchronized with a speed of a second rotating member. Since this latter member may be made to rotate in accordance with a synchronizing control variation, it is apparent that the former may also be caused to rotate in accordance with such synchronizing variation.

While the arcuate conducting segments 36, 38 may be made of any electrically conductive material, it will be appreciated that, if desired, they may be composed of any suitable substance having relatively high electrical resistance. In such an event, and assuming that the slip ring 32 is connected to the conducting segment 36 at point 78 midway on the periphery thereof, and that slip ring 34 is connected to the conducting segment 38 at a point 80 midway on the periphery thereof (Fig. 4), then the greater the angular displacement of the switch assemblies 28 and 52 from the position shown in Figs. 3 and 4, the greater will be the current flow through the transformer winding 68. This is due to the decreased voltage drop through the high-resistance material composing segments 36 and 38 as the contacts 64 and 66 approach the points 78, 80 or, in other words, when the contacts 64, 66 approach a position which is approximately 90° away from the position shown in Fig. 4. Accordingly, the greater the departure from synchronism (within obvious limits) of the speeds of the shafts 18 and 46, the greater will be the compensating control current which flows through the winding 68 and acts to bring the shafts back into synchronism.

It is obvious that, if desired, the positions of the switch assemblies 28 and 52 may be reversed. In other words, the switch assembly 52 may be mounted on the shaft 18, and the switch assembly 28 may be mounted on the shaft 46. The operation of the system would be unchanged by such a modification. It is also obvious that a further transformer may be inserted in the leads 74, 76 so as to reduce the voltage which is selectively applied across the winding 68 through the switch assemblies 28 and 52.

Having thus described my invention, I claim:

1. In a motor speed control system: a first motor connected to a source of alternating current to rotate at a speed proportional thereto; a second motor; means for causing said second motor to operate at a substantially constant speed; electrical switching means respectively connected to each of said first and second motors, said switching means being normally open when the speed of said first motor bears a predetermined constant ratio to the speed of said second motor; and means energized upon a closure of said switching means upon a departure in speed ratio between the first motor and the second motor for varying the current supply to said first motor from said source in opposite sense to the direction of departure of said first motor from said predetermined constant ratio, said means energized upon a closing of said switching means including one winding of a transformer, the other winding of said transformer being connected to said source of alternating current in series with said first motor.

2. In a motor speed control system: a pair of coaxial shafts; means for driving one of said shafts at a substantially constant speed; a set of switch contacts carried by said one shaft; a motor connected to the other of said shafts; a source of power for said motor normally having a value such that said pair of shafts are rotated in synchronism; a second set of switch contacts carried by said other shaft and designed for selective electrical engagement with said first-mentioned set of switch contacts; means for connecting said first-mentioned set of switch contacts to said source of power; a transformer having one winding connected to said source of power in series with said motor; and means connecting said second set of switch contacts to the other winding of said transformer.

3. A motor speed control system as set forth in claim 2, in which the selective electrical engagement of said two sets of switch contacts varies in accordance with the direction of departure from synchronism of said pair of shafts.

4. A motor speed control system in accordance with claim 2, in which said first-mentioned set of switch contacts comprises a pair of brushes diametrically opposed relative to the axis of said one shaft, and in which said second set of switch contacts comprises a pair of arcuate conducting segments separated by a strip of insulating material, the two said brushes normally engaging the surface of said insulating strip when said two shafts are rotating in synchronism, so that upon a variation in the speed of said other shaft relative to the speed of said one shaft, said brushes will respectively engage the said arcuate conducting segments and thus connect said source of power electrically to the said other winding of said transformer.

5. In a motor speed control system, a pair of coaxial shafts, a set of switch contacts carried by one of said shafts, a set of resistance elements carried by the other of said shafts and arranged for selective electrical engagement with said set of switch contacts, means for driving one of said shafts at a substantially constant speed, a motor connected to the other of said shafts, a source of power for said motor normally having a value such that said pair of shafts is rotated in synchronism, a transformer having one winding connected to said source of power in series with said motor, and a connection between the other winding of said transformer and said source of power, said latter connections including said contacts and said resistance elements.

6. In a motor speed control system, a pair of coaxial shafts, a switch contact carried by one of said shafts, a resistance element carried by the other of said shafts and arranged for selective electrical engagement with said switch contact, means for driving one of said shafts at a substantially constant speed, a motor connected to the other of said shafts, a source of power for said motor normally having a value such that said pair of shafts is rotated in synchronism, a transformer having one winding connected to said source of power in series with said motor, and a connection between the other winding of said transformer and said source of power, said latter connections including said contact and said resistance element.

GEORGE C. SZIKLAI.

REFERENCES CITED

The following references are of record in the file of this patent:

UNITED STATES PATENTS

| Number | Name | Date |
| --- | --- | --- |
| 843,731 | Arnold et al. | Feb. 12, 1907 |
| 1,337,573 | Warburton | Apr. 20, 1920 |
| 1,487,492 | Thompson | Mar. 18, 1924 |
| 1,490,733 | Crosby | Apr. 15, 1924 |
| 1,521,824 | Merrill | Jan. 6, 1925 |
| 1,939,338 | Dijksterhuis | Dec. 12, 1933 |
| 2,150,239 | Nichols | Mar. 14, 1939 |
| 2,230,821 | Artzt | Feb. 4, 1941 |
| 2,230,822 | Artzt | Feb. 4, 1941 |
| 2,246,284 | Artzt | June 17, 1941 |
| 2,329,077 | Nichols | Sept. 7, 1943 |
| 2,378,746 | Beers | June 19, 1945 |
| 2,404,571 | Finch | July 23, 1946 |
| 2,428,946 | Somers | Oct. 14, 1947 |

FOREIGN PATENTS

| Number | Country | Date |
| --- | --- | --- |
| 307,322 | Great Britain | Mar. 5, 1929 |